US012187198B2

United States Patent
Freeman-Powell

(10) Patent No.: US 12,187,198 B2
(45) Date of Patent: Jan. 7, 2025

(54) DRIVER ASSISTANCE METHOD AND APPARATUS

(71) Applicant: JAGUAR LAND ROVER LIMITED, Coventry (GB)

(72) Inventor: Aaron Freeman-Powell, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 17/438,264

(22) PCT Filed: Mar. 3, 2020

(86) PCT No.: PCT/EP2020/055590
§ 371 (c)(1),
(2) Date: Sep. 10, 2021

(87) PCT Pub. No.: WO2020/182549
PCT Pub. Date: Sep. 17, 2020

(65) Prior Publication Data
US 2022/0219607 A1    Jul. 14, 2022

(30) Foreign Application Priority Data

Mar. 12, 2019    (GB) ...................................... 1903323

(51) Int. Cl.
*B60R 1/26* (2022.01)
*B60R 1/31* (2022.01)
(Continued)

(52) U.S. Cl.
CPC .................. *B60R 1/26* (2022.01); *B60R 1/31* (2022.01); *B60W 10/18* (2013.01); *B60W 50/14* (2013.01);
(Continued)

(58) Field of Classification Search
None
See application file for complete search history.

(56) References Cited

U.S. PATENT DOCUMENTS

| 6,693,524 B1 * | 2/2004 | Payne | H04N 7/181 |
| | | | 348/E7.086 |
| 6,923,080 B1 | 8/2005 | Dobler et al. | |

(Continued)

FOREIGN PATENT DOCUMENTS

| CN | 1460375 A | 12/2003 |
| CN | 106240456 A | 12/2016 |

(Continued)

OTHER PUBLICATIONS

International Search Report corresponding to International Application No. PCT/EP2020/055590, dated Apr. 6, 2020, 6 pages.
(Continued)

*Primary Examiner* — Rebecca A Volentine
(74) *Attorney, Agent, or Firm* — Reising Ethington P.C.

(57) ABSTRACT

Aspects of the present invention relate to a driver assistance system for a towing vehicle coupled to a towed vehicle. The driver assistance system includes a controller. The driver assistance system is configured to receive first image data from a towed vehicle imaging device disposed on the towed vehicle. The first image data represents a first scene behind the towed vehicle. The first image data is processed to identify object image data representative of one or more objects of interest in the first scene. An object distance is determined from a reference point to the or each object of interest identified in the first scene. A signal indicative of the object distance is output by the driver assistance system. Aspects of the present invention also relate to a vehicle
(Continued)

including a driver assistance system; a method of assisting a driver; computer software; and a computer readable medium.

14 Claims, 7 Drawing Sheets

(51) Int. Cl.
*B60W 10/18* (2012.01)
*B60W 50/14* (2020.01)
*G06T 7/70* (2017.01)

(52) U.S. Cl.
CPC .......... *G06T 7/70* (2017.01); *B60R 2300/105* (2013.01); *B60R 2300/107* (2013.01); *B60R 2300/307* (2013.01); *B60R 2300/802* (2013.01); *B60R 2300/806* (2013.01); *B60R 2300/8086* (2013.01); *B60R 2300/8093* (2013.01); *B60W 2050/146* (2013.01); *G06T 2207/30252* (2013.01)

(56) References Cited

U.S. PATENT DOCUMENTS

| 2002/0149673 | A1 | 10/2002 | Hirama et al. |
| 2015/0294166 | A1 | 10/2015 | Kuehnle et al. |
| 2016/0129939 | A1* | 5/2016 | Singh ................. B62D 15/0285 701/41 |
| 2016/0362050 | A1* | 12/2016 | Lee ....................... G06V 20/588 |
| 2017/0050567 | A1 | 2/2017 | Bochenek |
| 2017/0280091 | A1* | 9/2017 | Greenwood ........... H04N 5/265 |
| 2017/0341583 | A1 | 11/2017 | Zhang et al. |
| 2018/0124350 | A1 | 5/2018 | Greenwood et al. |
| 2018/0141496 | A1 | 5/2018 | Loehr et al. |
| 2019/0241126 | A1* | 8/2019 | Murad ................... B60R 1/003 |
| 2020/0247471 | A1* | 8/2020 | Grodde ................. G06V 20/58 |

FOREIGN PATENT DOCUMENTS

| CN | 107433905 A | 12/2017 |
| CN | 108621937 A | 10/2018 |
| CN | 108725323 A | 11/2018 |
| GB | 2541906 A | 3/2017 |
| GB | 2545045 A | 6/2017 |
| WO | 2017037266 A1 | 3/2017 |

OTHER PUBLICATIONS

Written Opinion corresponding to International Application No. PCT/EP2020/055590, dated Apr. 6, 2020, 7 pages.
Combined Search and Examination Report corresponding to Great Britain Application No. GB1903323.2, dated Aug. 27, 2019, 6 pages.
Great Britain Office Action corresponding to Application No. GB1903323.2, dated Aug. 10, 2021, 4 pages.
Chinese Office Action corresponding to Chinese application 202080028155.x, dated Apr. 26, 2023, 19 pages.
Chinese Office Action with English Translation corresponding to application 202080028155.X, dated Nov. 18, 2023, 19 pages.
English summary of Chinese Office Action corresponding to application 202080028155.x, dated Apr. 20, 2024, 20 pages.

* cited by examiner

DRIVER ASSISTANCE METHOD AND APPARATUS

TECHNICAL FIELD

The present disclosure relates to a driver assistance method and apparatus. Aspects of the invention relate to a driver assistance system, a vehicle, a method of assisting a vehicle driver, computer software and a computer readable medium.

BACKGROUND

It is known to provide an imaging device, such as a camera, on a trailer or similar towed vehicle. The image captured by the imaging device may be output to a display provided in a towing vehicle (connected to the trailer) to help a driver view objects which are obscured from view by the trailer. However, it may prove difficult for the driver to judge precisely the location of any such objects in the displayed image.

It is an aim of the present invention to address one or more of the disadvantages associated with the prior art.

SUMMARY OF THE INVENTION

Aspects and embodiments of the invention provide a driver assistance system, a vehicle, a method of assisting a vehicle driver, computer software and a computer readable medium as claimed in the appended claims.

According to an aspect of the present invention there is provided a driver assistance system for a towing vehicle coupled to a towed vehicle, the driver assistance system comprising a controller, the driver assistance system being configured to:
  receive first image data from a towed vehicle imaging device disposed on the towed vehicle, the first image data comprising a first scene behind the towed vehicle;
  process the first image data to identify object image data representative of one or more objects of interest in the first scene;
  determine an object distance from a reference point to the or each object of interest identified in the first scene; and
  output a signal indicative of the object distance. The object distance may be output for display, for example to improve driver awareness of the presence and/or location of the one or more objects of interest. The objects of interest may, for example, comprise another vehicle or a stationary obstacle.

The reference point is a virtual reference point and may defined in relation to the towing vehicle or the towed vehicle. The reference point could, for example, correspond to a longitudinal position of a driver in towing vehicle. Alternatively, the reference point could correspond to a location of a display device for displaying the first image data.

The object distance may be determined by analysing the first image data.

The towed vehicle imaging device may be orientated in a rearward-facing direction. The towed vehicle imaging device may be a stereo camera. The object distance may be determined using a technique such as disparity mapping. The towed vehicle imaging device may be a mono camera. The object distance may be determined using a technique such as structure from motion analysis. The object distance may be determined by comparing first and second images captured at respective first and second times. The size of the object of interest may be calculated with reference to the distance travelled in the time interval between capturing the first and second images. Alternatively, or in addition, may determine perceived size of a known object of interest in the image scene, for example using pattern matching techniques to classify the identified object of interest as a particular vehicle type. The system may, for example, differentiate between cars, motorbikes, lorries (trucks), vans etc.

The driver assistance system may be configured selectively to display the first image data. The object distance may selectively be overlaid on the first image data.

The driver assistance system may be configured to compare the object distance to a threshold distance. A proximity notification may be generated when the comparison identifies the object distance as being less than or equal to the threshold distance.

The driver assistance system may, for example, perform a trailer blind spot monitoring function. The notification may comprise displaying the first image data on the display screen with the object distance displayed as an overlay. The object distance may be displayed coincident with or adjacent to the object of interest within the displayed image.

The driver assistance system may be configured to control one or more vehicle systems, for example to control dynamic operation of the vehicle. For example, a vehicle braking system may be activated when the towing vehicle is reversing in dependence on the proximity notification.

The driver assistance system may be configured to receive second image data from a towing vehicle imaging device disposed on the towing vehicle. The towing vehicle imaging device may be orientated in a rearward-facing direction.

The driver assistance system may be configured selectively to display the second image data. The object distance may be selectively overlaid on the second image data. The object distance may be overlaid onto the second image data at a position corresponding to a determined position of the object of interest (even if the object of interest is partially or completely obscured by the towed vehicle.

The driver assistance system may be configured to combine a part of the first image data and a part of the second image data to generate composite image data. The composite image data represents a composite image combining at least a portion of the first image data and the second image data. The composite image data may be selectively output to a display. The driver assistance system may be configured selectively to overlay the object distance on the composite image data. The object distance may be displayed coincident with or adjacent to the object of interest within the composite image.

According to a further aspect of the present invention there is provided a vehicle comprising a driver assistance system as described herein.

According to a still further aspect of the present invention there is provided a method of assisting a driver of a towing vehicle coupled to a towed vehicle, the method comprising:
  receiving first image data from a towed vehicle imaging device disposed on the towed vehicle, the first image data comprising a first scene behind the towed vehicle;
  identifying one or more objects of interest in the first scene;
  determining an object distance from a reference point to the or each object of interest identified in the first scene; and
  outputting the determined object distance.

The method may comprise analysing the first image data to determine the object distance.

The towed vehicle imaging device may comprise a mono camera or a stereo camera.

The method may comprise selectively displaying the first image data. The method may comprise overlaying the object distance on the first image data.

The method may comprise comparing the object distance to a threshold distance. A proximity notification may be generated when the comparison identifies the object distance as being less than or equal to the threshold distance.

The method may comprise activating a braking system when the towing vehicle is reversing in dependence on the proximity notification.

The method may comprise receiving second image data from a towing vehicle imaging device disposed on the towing vehicle. The method may comprise selectively displaying the second image data. The object distance may be overlaid on the second image data.

The method may comprise combining a part of the first image data and a part of the second image data to generate composite image data. The composite image data may be selectively displayed. The method may comprise selectively overlaying the object distance on the composite image data.

According to a further aspect of the present invention there is provided a computer software that, when executed, is arranged to perform the method(s) described herein.

According to a further aspect of the present invention there is provided a non-transitory, computer-readable storage medium storing instructions thereon that, when executed by one or more electronic processors, causes the one or more electronic processors to carry out the method(s) described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A driver assistance system 1 in accordance with an embodiment of the present invention will now be described with reference to the accompanying figures. The driver assistance system 1 is configured to determine an object distance (or range) D-n between a reference point R1 and one or more objects of interest O-n.

Figure 1:
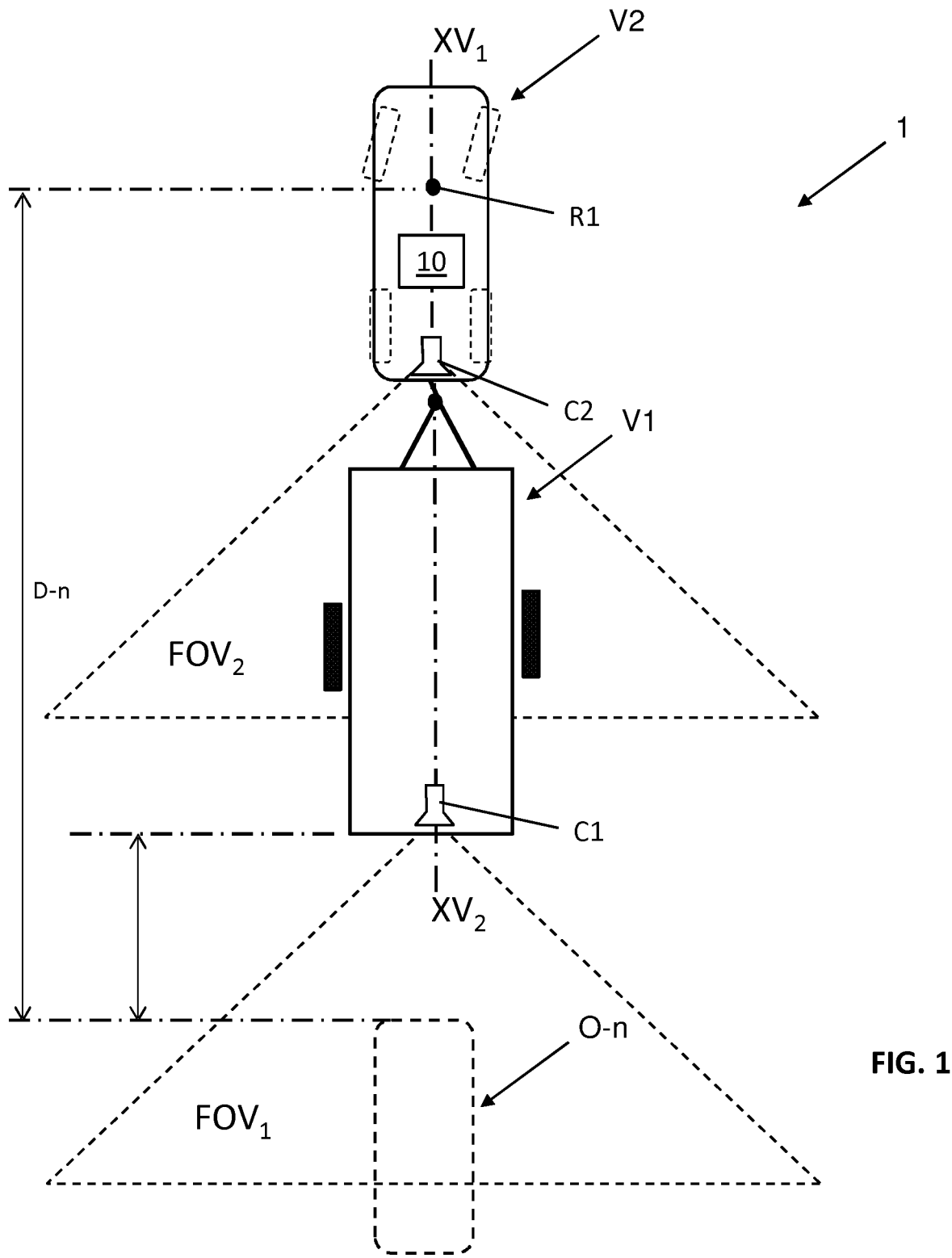
FIG. 1 shows a schematic representation of a driver assistance system according to an embodiment of the present invention provided in a towing vehicle and a towed vehicle.
Figure 2:
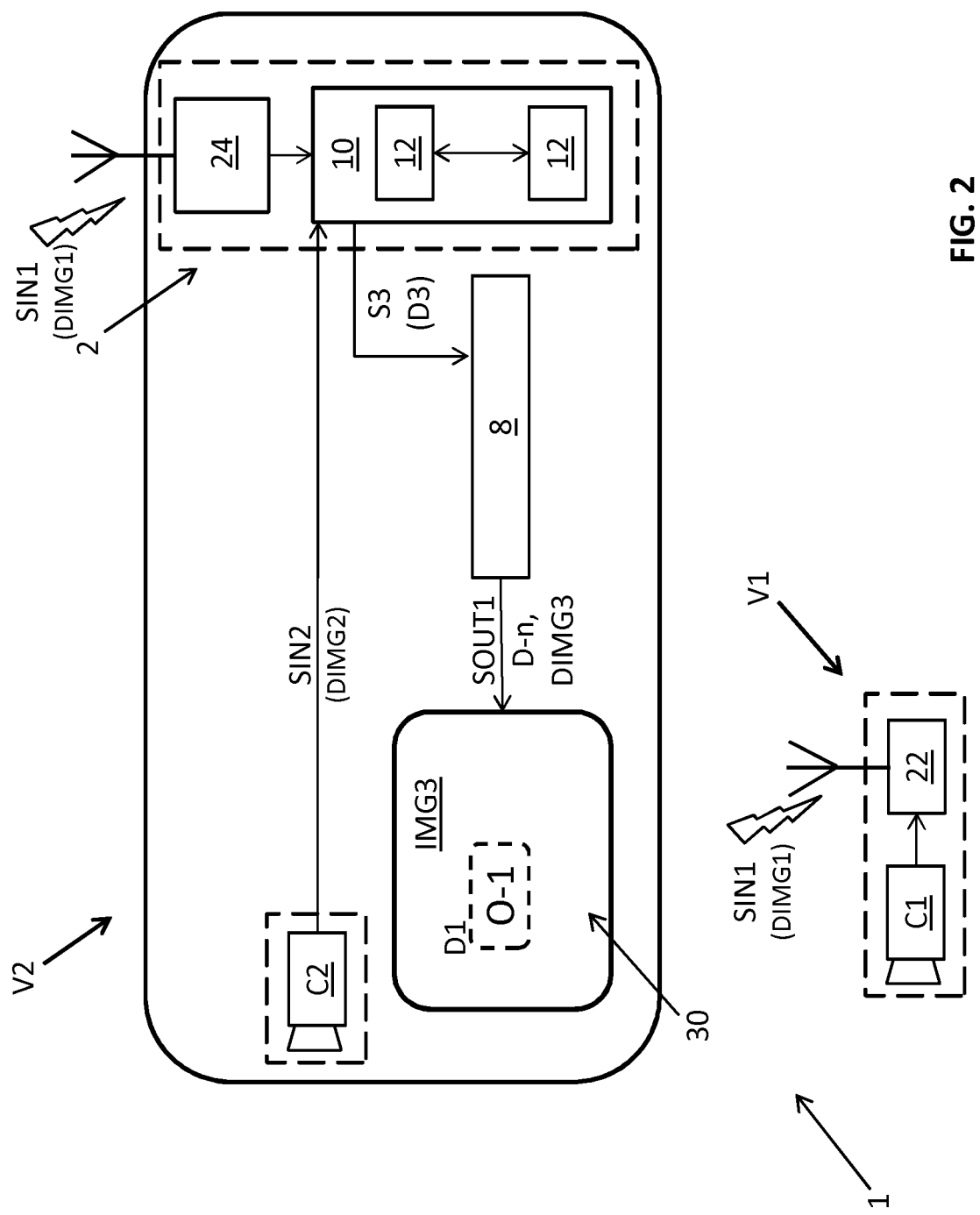
FIG. 2 shows a schematic representation of the towing vehicle incorporating a controller for implementing the driver assistance system shown in FIG. 1.

The driver assistance system 1 is suitable for use in a towing vehicle V2 which is coupled to a towed vehicle V1. In the present embodiment, the towing vehicle V2 and the towed vehicle V1 are connected to each other by an articulated coupling. A schematic representation of the driver assistance system 1 provided in the towing vehicle V2 and the towed vehicle V1 is illustrated in FIG. 1. The towing vehicle V2 in the present embodiment is an automobile. Other types of towing vehicle V2 are contemplated, such as a utility vehicle, a sports utility vehicle, a tractor, a truck etc. The towed vehicle V1 in the present embodiment is a trailer. The towed vehicle V1 has a first longitudinal axis XV1; and the towing vehicle V2 has a second longitudinal axis XV2. A schematic representation of the towing vehicle V2 is shown in FIG. 2.

The reference point R1 is a virtual point (or origin) defined in a fixed location on the towing vehicle V2. In the arrangement illustrated in FIG. 1, the reference point R1 is defined at a longitudinal position coincident with a seating location of a driver of the towing vehicle V2 (for example aligned with a hip point of the driver). The object distance D-n in this arrangement represents a distance between the driver and the object of interest O-n. By defining the reference point R1 in relation to the position of the driver, the driver may more readily visualise the relative position of the or each object of interest O-n. In a variant, the reference point R1 could be defined in a fixed location on the towed vehicle V1, for example at a rearmost position on a centreline of the towed vehicle V1.

Figure 3B:
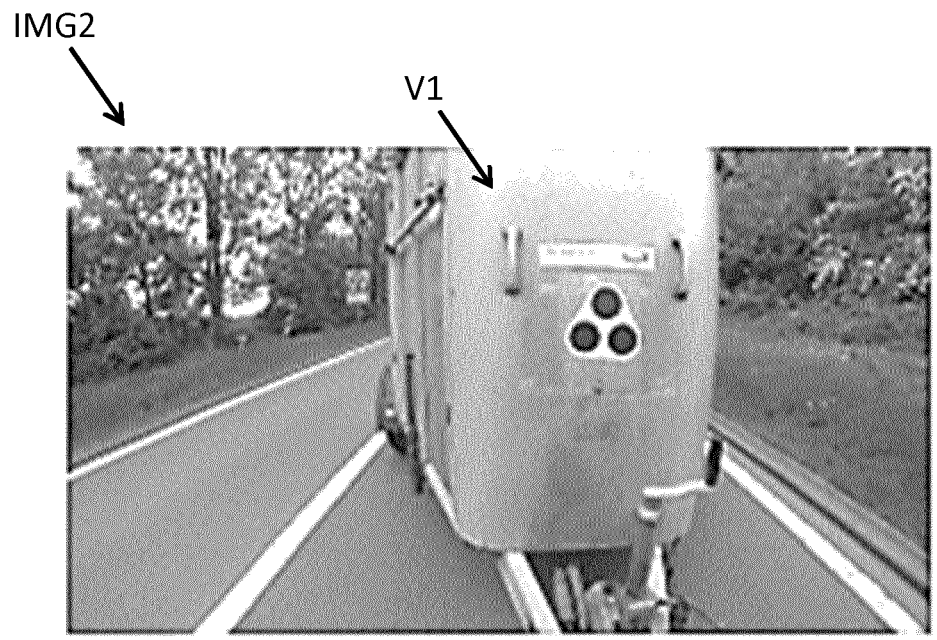
FIG. 3B shows a towing vehicle image captured by a camera disposed in the towing vehicle.
Figure 3A:
FIG. 3A shows a towed vehicle image captured by a camera disposed in the towed vehicle.

A first imaging device C1 is disposed on the towed vehicle V1 and oriented in a rear-facing direction. The first imaging device C1 is mounted centrally at the rear of the towed vehicle V1, for example above a rear license plate (not shown). Other mounting locations for the first imaging device C1 are contemplated. The first imaging device C1 comprises a towed vehicle camera C1. The towed vehicle camera C1 has an optical axis substantially parallel to the first longitudinal axis XV1. The towed vehicle camera C1 has a first field of view FOV1 which encompasses a region to the rear of the towed vehicle V1. In use, the towed vehicle camera C1 generates first image data DIMG1 corresponding to a towed vehicle image IMG1. The towed vehicle image IMG1 comprises a rear-facing scene from the towed vehicle V1 captured by the towed vehicle camera C1. The towed vehicle image IMG1 may, for example, include an image of a section of road behind the towed vehicle V1. The towed vehicle image IMG1 may include one or more objects of interest O-n. The objects of interest O-n may, for example, comprise one or more other vehicles travelling behind the towed vehicle V1 and/or offset laterally from the towed vehicle V1. The towed vehicle camera C1 outputs a first signal SIN1 comprising said first image data DIMG1 corresponding to the towed vehicle image IMG1. A towed vehicle image IMG1 is shown in FIG. 3A by way of example.

A second imaging device C2 is disposed on the towing vehicle V2 and oriented in a rear-facing direction. The second imaging device C2 is mounted centrally at the rear of the towing vehicle V2, for example above a rear license plate (not shown). Other mounting locations for the second imaging device C2 are contemplated. The second imaging device C2 comprises a towing vehicle camera C2. The towing vehicle camera C2 has an optical axis substantially parallel to the second longitudinal axis XV2. The towing vehicle camera C2 has a second field of view FOV2 which encompasses a region to the rear of the towing vehicle V2. In use, the towing vehicle camera C2 generates second image data DIMG2 corresponding to a towing vehicle image IMG2. The towing vehicle image IMG2 comprises a rear-facing scene from the towing vehicle V2 captured by the towing vehicle camera C2. The towing vehicle image IMG2 may, for example, include at least a portion of a front of the towed vehicle V1 as well as some of the environment around the towed vehicle V1, for example to the sides and/or above and/or below the towed vehicle V1. The towing vehicle camera C2 outputs a second signal SIN2 comprising said second image data DIMG2 corresponding to the towing vehicle image IMG2. A towing vehicle image IMG2 is shown in FIG. 3B by way of example. As shown in FIG. 3B, the towed vehicle V2 is visible in the towing vehicle image IMG2 and partially obscures the field of view.

The towed vehicle camera C1 and the towing vehicle camera C2 are digital video cameras. The towed vehicle camera C1 is operable to capture a plurality of first image frames IMG1-F(n) per second. The towing vehicle camera C2 is operable to capture a plurality of second image frames IMG2-F(n) per second. The towed vehicle camera C1 and the towing vehicle camera C2 each have a wide-angle lens with an angle of view of approximately 180°. The angle of view of the towed vehicle camera C1 and the towing vehicle camera C2 could be narrower. The towed vehicle camera C1 and/or the towing vehicle camera C2 may be a mono camera or a stereo camera. The towed vehicle camera C1 can function as a reversing camera to provide a parking aid when the towed vehicle V1 is coupled to the towing vehicle V2. The towing vehicle camera C2 can selectively function as a reversing camera to provide a parking aid when the towed vehicle V1 is not coupled to the towing vehicle V2. The towed vehicle camera C1 and the towing vehicle camera C2 are arranged at approximately the same vertical height above ground level. In alternate arrangements, the towing vehicle camera C2 and the towed vehicle camera C1 may be offset from each other in a vertical direction and/or a transverse direction. A correction may be applied to allow for any vertical offset between the towed vehicle camera C1 and the towing vehicle camera C2. Alternatively, or in addition, a correction may be applied to correct for an angular offset between the towed vehicle camera C1 and the towing vehicle camera C2.

The driver assistance system 1 comprises one or more controller 10. The controller 10 is in communication with the towed vehicle camera C1. The driver assistance system 1 is configured to receive the first image data DIMG1 from the towed vehicle camera C1 disposed on the towed vehicle V1. The first imaging device C1 is orientated in a rearward-facing direction such that the first image data DIMG1 represents a scene behind the towed vehicle V1. The controller 10 processes the first image data DIMG1 to identify object image data DO-n representative of one or more objects of interest O-n in the first scene. The controller 10 determines the object distance D-n between the reference point R1 to the or each object of interest O-n identified in the first scene. As described herein, an object distance signal SOUT1 is output by the controller 10 to indicate the object distance D-n.

In the present embodiment, the controller 10 is disposed in the towing vehicle V2. In a variant, the controller 10 could be provided in the towed vehicle V1, or the processing could be performed by separate controllers 10 provided on the towed vehicle V1 and the towing vehicle V2. It is to be understood that the or each controller 10 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 10 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 10 to implement the control techniques described herein (including some or all of the functionality required for the method described herein). The set of instructions could be embedded in said one or more electronic processors of the controller 10; or alternatively, the set of instructions could be provided as software to be executed in the controller 10. A first controller or control unit may be implemented in software run on one or more processors. One or more other controllers or control units may be implemented in software run on one or more processors, optionally the same one or more processors as the first controller or control unit. Other arrangements are also useful.

Figure 4:
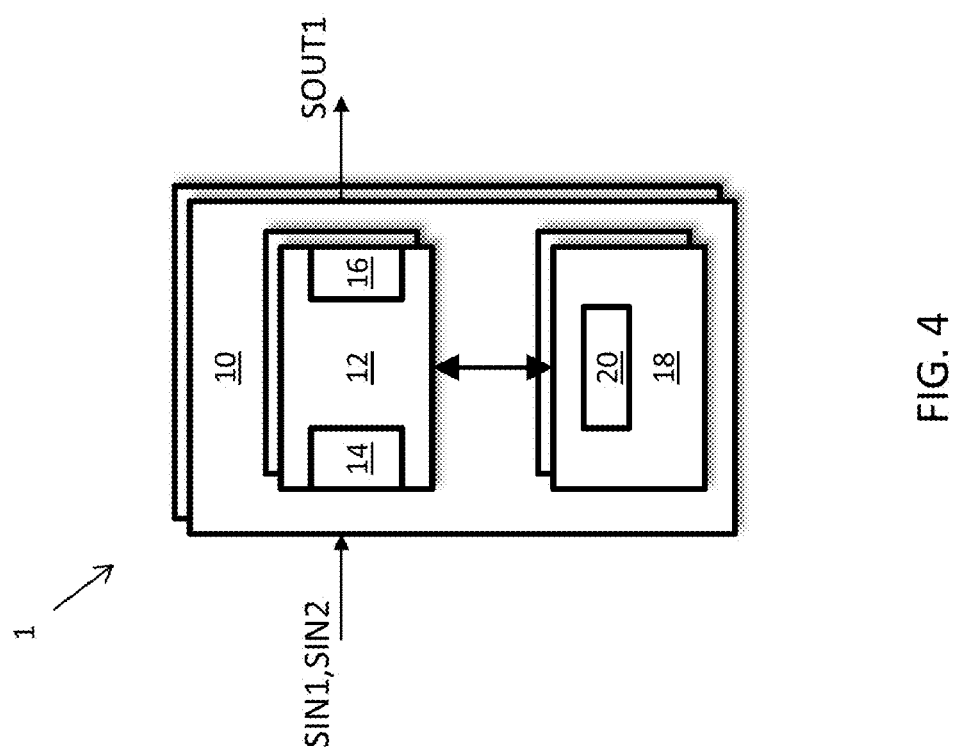
FIG. 4 shows a schematic representation of the controller of the driver assistance system.

As illustrated in FIG. 4, the or each controller 10 comprises at least one electronic processor 12 having one or more electrical input(s) 14 for receiving one or more input signals from the towed vehicle camera C1 and the towing vehicle camera C2; and one or more electrical output(s) 16 for outputting the output signal S1. The or each controller 10 further comprises at least one memory device 18 electrically coupled to the at least one electronic processor 12 and having instructions 20 stored therein. The at least one electronic processor 12 is configured to access the at least one memory device 18 and execute the instructions 20 thereon so as to perform the method(s) described herein.

The, or each, electronic processor 12 may comprise any suitable electronic processor (e.g., a microprocessor, a microcontroller, an ASIC, etc.) that is configured to execute electronic instructions. The, or each, electronic memory device 18 may comprise any suitable memory device and may store a variety of data, information, threshold value(s), lookup tables or other data structures, and/or instructions therein or thereon. In an embodiment, the memory device 18 has information and instructions for software, firmware, programs, algorithms, scripts, applications, etc. stored therein or thereon that may govern all or part of the methodology described herein. The processor, or each, electronic processor 12 may access the memory device 18 and execute and/or use that or those instructions and information to carry out or perform some or all of the functionality and methodology describe herein.

The at least one memory device 18 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

The first signal SIN1 comprising the first image data DIMG1 is input to the controller 10 via the one or more input(s) 14. The connection between the controller 10 and the towed vehicle camera C1 could be a wired connection (for example comprising an electrical connection between the towed vehicle V1 and the towing vehicle V2). In the present embodiment, however, a wireless connection is established between the controller 10 and the towed vehicle camera C1. The towed vehicle camera C1 is connected to a transmitter 22 configured to transmit the first image data DIMG1 as a radio frequency (RF) signal to a receiver 24 provided in the towing vehicle V2. The receiver 24 is connected to the one or more input(s) 14 of the controller 10. The second signal SIN2 comprising the second image data DIMG2 is input to the controller 10 via the one or more input(s) 14. The connection between the controller 10 and the towing vehicle camera C2 is a wired connection. For example, the towing vehicle camera C2 may be connected to the controller 10 over a vehicle communication network 26, such as a CAN bus. In use, the first image data DIMG1 and the second image data DIMG2 is input to the controller 10. The towing vehicle V2 comprises a display screen 28 on which the towed vehicle image IMG1 and the towing vehicle image IMG2 (received from the towed vehicle camera C1 and the towing vehicle camera C2 respectively) can be selectively displayed.

The controller 10 is configured to process the first and second image data DIMG1, DIMG2. In particular, the controller 10 implements an image processing module to analyse the first and second image data DIMG1, DIMG2. The controller 10 processes the first image data DIMG1 to identify one or more objects of interest O-n in the image captured by the towed vehicle camera C1. An image processing algorithm may determine an optical flow of image elements in the first image data DIMG1. An optical flow vector may be generated for each image element to represent a direction and magnitude of the movement of the image elements, for example between a plurality of temporally offset image frames. By analysing the optical flow vectors, the controller 10 may identify the or each object of interest O-n. The controller 10 may, for example, use the optical flow vectors to differentiate between image elements corresponding to background features (which tend to be transient within the first image data DIMG1 when the towed vehicle V1 is moving); and image elements corresponding to one or more other vehicles (which have a greater persistency within the image data DIMG1 if they are travelling in the same direction as the towed vehicle V1). The image elements identified as corresponding to another vehicle is classified as an object of interest O-n. Other image processing algorithms include edge detection and pattern matching. One or more of these image processing algorithms may be used to identify the objects of interest O-n in the first image data DIMG1. Other image processing algorithms may usefully be employed.

The controller 10 determines the object distance D-n from the reference point R1 to the or each object of interest O-n identified in the first image data DIMG1. In embodiments in which the towed vehicle camera C1 comprises a stereo camera having spatially separated first and second cameras, the object distance D-n may be determined by comparing the images captured by the first and second cameras, for example by performing disparity mapping. In embodiments in which the towed vehicle camera C1 comprises a mono camera, the object distance D-n may be determined using analysis techniques such as structure from motion.

The controller 10 may be configured to identify (or classify) the object of interest O-n as being a particular object type. The controller 10 may, for example, identify the object of interest O-n as being a particular type of vehicle, such as a cyclist, a motorbike, an automobile, a van, a bus, a tram, or a truck. The object of interest O-n may be identified in dependence on a determined similarity with one or more predefined models. The predefined models may represent a plurality of different types of objects, for example the aforementioned different vehicle types. The object of interest O-n may be identified in dependence on the determined similarity. The object distance D-n may be determined in dependence on a perceived size of the identified object type. The controller 10 can identify the object of interest O-n as being a particular object or vehicle type and then determine the object distance D-n in dependence on a size of the object of interest O-n in the first image IMG1.

The towing vehicle V1 comprises a display 30 on which the towed vehicle image IMG1 and the towing vehicle image IMG2 can be selectively displayed. The controller 10 is configured to output the object distance signal SOUT1. The controller 10 may optionally also be configured to output the identification (or classification) of the object of interest O-n. The object type may be overlaid onto the image displayed on the display 30.

Figure 5:
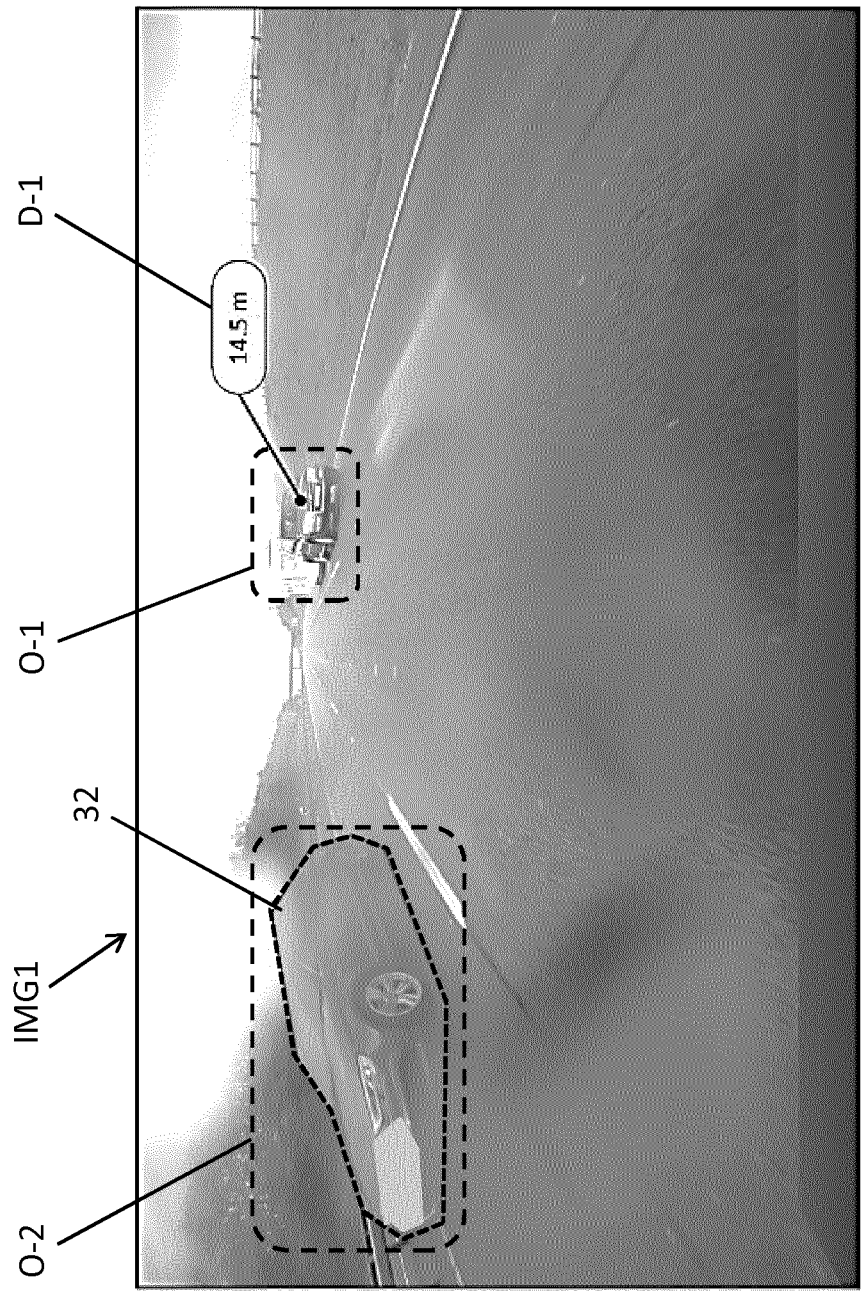
FIG. 5 shows an image captured by the towed vehicle imaging device augmented with an object distance.

The object distance signal SOUT1 may be used to augment the towed vehicle image IMG1 and/or the towing vehicle image IMG2 with the object distance D-n. As illustrated in FIG. 5, the object distance D-n may be overlaid onto the towed vehicle image IMG1 and/or the towing vehicle image IMG2. The object distance D-n may be positioned on the towed vehicle image IMG1 and/or the towing vehicle image IMG2 at a location coincident with or adjacent to the object of interest O-n within that image. The controller 10 could be configured to generate augmented towed vehicle data AD-n and/or augmented towing vehicle data AD2 comprising the object distance signal SOUT1.

The controller 10 may be configured to modify the towed vehicle image IMG1 and/or the towing vehicle image IMG2 to highlight the object of interest O-n. As illustrated in FIG. 5, an object identifier 32 may be displayed over at least a portion of the object of interest O-n within the towed vehicle image IMG1 and/or the towing vehicle image IMG2. The object identifier 32 may comprise an outline of the object of interest O-n, for example. The outline of the object of interest O-n could, for example, be determined using the image processing techniques described herein to determine the external visible boundary (or edge) of the towed vehicle V1. In the illustrated arrangement, the object identifier 32 comprises a semi-transparent overlay. The object identifier 32 may be coloured. The controller 10 may alter the colour of the object identifier 32 in dependence on the determined object distance D-n. For example, the colour of the object identifier 32 may be modified to provide a visual indication that the object of interest O-n is within a predefined distance threshold. The colour of object identifier 32 may be modified as follows: coloured green if the object distance D-n is greater than a first distance threshold; coloured amber (orange) if the object distance D-n is less than the first distance threshold and greater than a second distance threshold; and coloured red if the object distance D-n is less than the second distance threshold. At least in certain embodiments, the object identifier 32 may provide an alert to the driver, for example to indicate that the object of interest O-n is in close proximity to the towing vehicle V1. Alternatively, or in addition, the colour of the object identifier 32 may be modified in dependence on a rate of change of the object distance D-n. Other alerts, such as an audible alert or a haptic alert, may be generated in dependence on the determined object distance D-n.

Figure 6A:
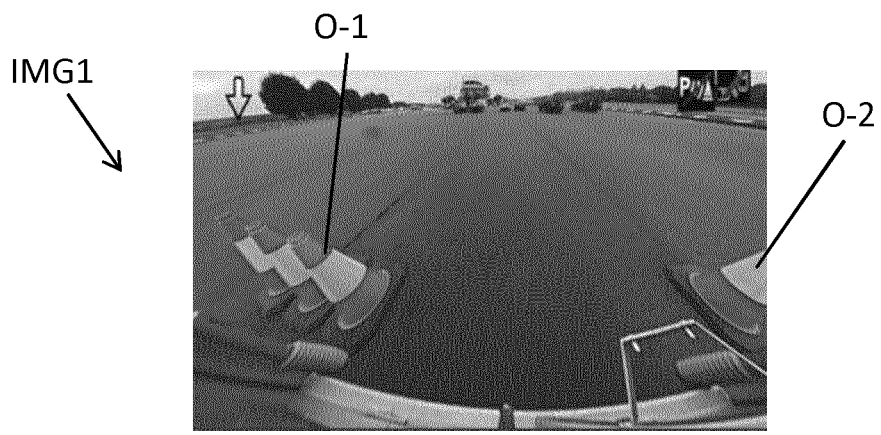
FIG. 6A shows an example of a towed vehicle image captured by the first imaging device disposed at the rear of the towed vehicle.
Figure 6B:
FIG. 6B shows a first modified version of the towed vehicle image shown in FIG. 6A augmented to highlight objects of interest within the field of view of the first imaging device.
Figure 6C:
FIG. 6C shows a second modified version of the towed vehicle image shown in FIG. 6A augmented to highlight objects of interest within the field of view of the first imaging device.

A further example of the operation of the driver assistance system 1 to augment the towed vehicle image IMG1 will now be described with reference to FIGS. 6A, 6B and 6C. In this example, the combined towed vehicle V1 and the towing vehicle V2 are reversing and a plurality of objects of interest O-n are identified in the towed vehicle image IMG1. As shown in FIG. 6A, the objects of interest O-n in this example are in the form of traffic cones. The controller 10 processes the first image data DIMG1 and identifies the objects of interest O-n. The controller 10 also determines the object distance D-n for the or each object of interest O-n. The object distance D-n may be determined in relation to a reference point R1 disposed at a rear of the towed vehicle V1. The reference point may comprise a coordinate, an axis or a plane form which the object distance D-n may be determined. The object distance D-n may be determined in a single direction (for example along the longitudinal axis); or in a plurality of directions (for example along the longitudinal axis and the transverse axis).

The controller 10 augments the towed vehicle image IMG1 with at least one object identifier 32 comprising a rectangular frame. In the example shown in FIG. 6B, a first object identifier 32 is displayed over the plurality of objects of interest O-1 on the left-hand side of the towed vehicle image IMG1; and a second object identifier 32 is displayed over the single object of interest O-2 on the right-hand side of the towed vehicle image IMG1. The colour of each object identifier 32 may be modified in dependence on the determined distance from the reference point R1. For example if the object distance D-n is less than a predefined first distance threshold, the object identifier may be displayed in a first colour (for example orange); and if the object distance D-n is less than a predefined second distance threshold (which is smaller than the first distance threshold), the object identifier may be displayed in a second colour (for example red). The controller 10 may be configured to differentiate between the objects of interest O-n in the left and right groups. A separate object distance D-n may be calculated for each object of interest O-n. As shown in FIG. 6C, a separate object identifier 32 may be displayed for each object of interest O-n. The object identifiers 32 may be colour coded in dependence on the determined object distance D-n for the associated objects of interest. In the example shown in FIG. 6C, the object identifier 32 associated with the object of interest O-1 furthest from the reference point R1 (i.e. having the largest object distance D-n) is displayed in a first colour (orange in the original image IMG1); and the remaining object identifiers 32 are displayed in a second colour (red in the original image IMG1).

Alternatively, or in addition, the controller 10 may be configured to identify an edge or outer profile of each object of interest. The controller 10 may generate an object identifier 32 in dependence on the edge or outer profile. For example, the object identifier 32 may correspond to at least a portion of an identified outline of each object of interest O-n. The object identifier 32 could be colour-coded in dependence on the determined object distance D-n, for example by displaying an overlay over the object of interest O-n.

Figure 7:
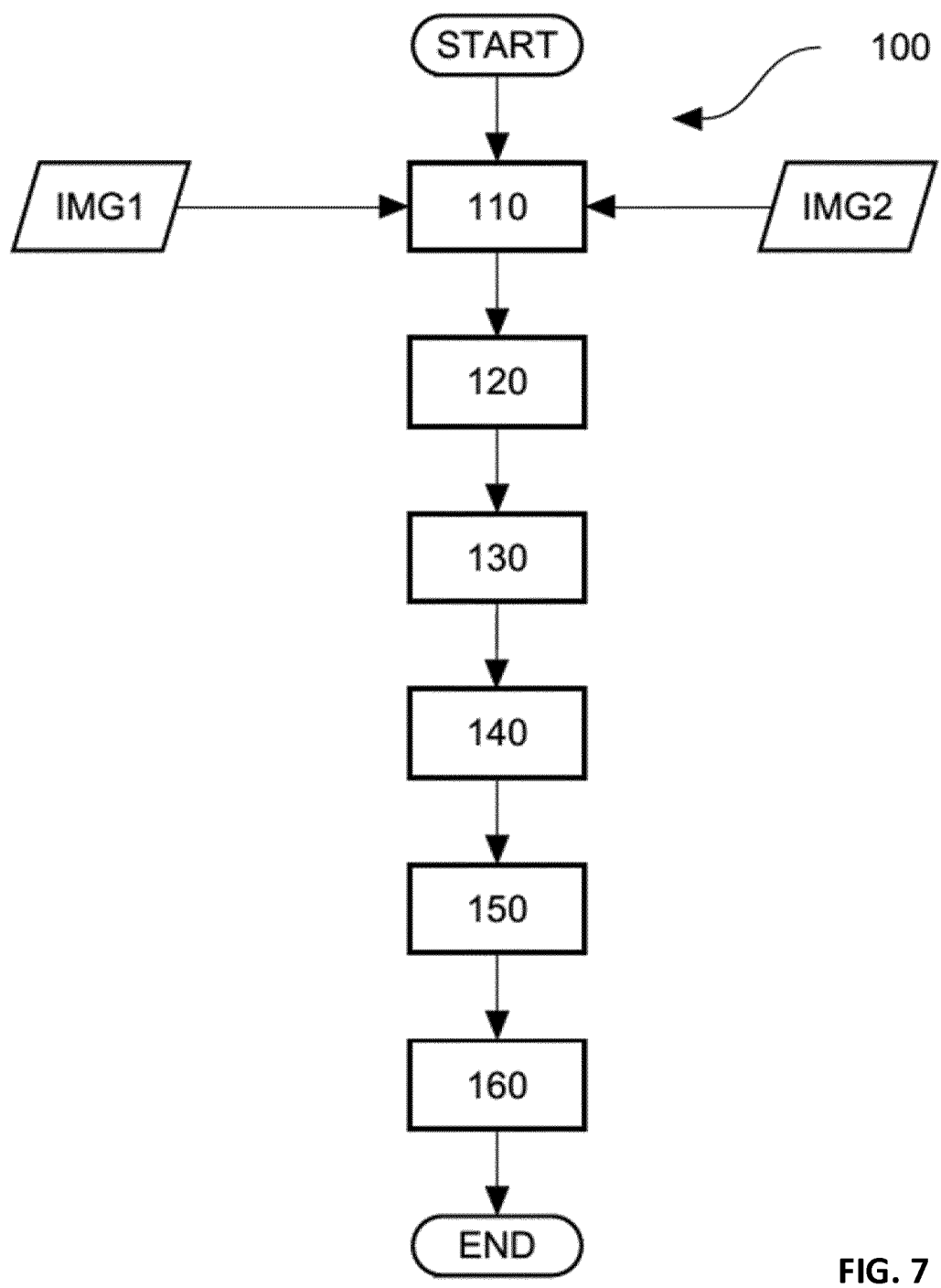
FIG. 7 shows a flow diagram representing operation of the driver assistance system.

The operation of the driver assistance system 1 will now be described with reference to a flow diagram 100 shown in FIG. 7. The controller 10 receives the towed vehicle image IMG1 and the towing vehicle image IMG2 from the towed vehicle camera C1 and the towing vehicle camera C2 respectively (BLOCK 110). The controller 10 processes the towed vehicle image IMG1 (and optionally also the towing vehicle image IMG2) to identify one or more objects of interest O-n (BLOCK 120). The controller 10 determines an object distance D-n from the predefined reference point R1 to the or each object of interest O-n (BLOCK 130). The controller 10 outputs the object distance signal SOUT1 (BLOCK 140). The object distance D-n is overlaid onto the towed vehicle image IMG1 or the towing vehicle image IMG2 to generated augmented towed vehicle data AD-n and/or augmented towing vehicle data AD2 (BLOCK 150). The augmented towed vehicle data AD-n and/or augmented towing vehicle data AD2 is output to the display 30 for display (BLOCK 160).

The display of the object distance D-n facilitates determination of the relative position of the other vehicles and the like in relation to the towing vehicle V2. When the towed vehicle V1 and the towing vehicle V2 are connected, at least a portion of the towing vehicle image IMG2 may be obscured by the presence of the towed vehicle V1. The object distance D-n may be overlaid onto the towing vehicle image IMG1 to improve driver awareness of the presence and/or location of other vehicles.

The driver assistance system 1 may be configured to control one or more vehicle systems VS-n to control dynamic operation of the towing vehicle V2. For example, during a reversing manoeuvre, the driver assistance system 1 may be configured to actuate a vehicle braking system VS-1 if the determined object distance D-n decreases to less than a predefined distance threshold. The predefined distance threshold may be defined, for example, in dependence on a combined length of the towed vehicle V1 and the towing vehicle V2.

Example controllers 10 have been described comprising at least one electronic processor 12 configured to execute electronic instructions stored within at least one memory device 18, which when executed causes the electronic processor(s) 12 to carry out the method as herein described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

The controller 10 may be configured to combine at least a portion of the first image data DIMG1 with at least a portion of the second image data DIMG2 to generate composite image data. The controller 10 may, for example, analyse the towing vehicle image IMG2 to identify a periphery of the towed vehicle V1 representing an external visible boundary (or edge) of the towed vehicle V1 from the view point of the towing vehicle camera C2. The controller 10 may, for example, identify the periphery by calculating optical flow vectors of pixels between two or more frames of the towing vehicle image IMG2. The region of the towing vehicle image IMG2 enclosed by the periphery represents the towed vehicle V1 within the towing vehicle image IMG2.

At least a portion of the towed vehicle image IMG1 may be selectively inserted into a region of the towing vehicle image IMG2 disposed inside the identified periphery P1. The resulting composite image data DIMG3 may be output to the display 30. The composite image data DIMG3 may represent a composite image IMG3 comprising at least a portion of each of the towed vehicle image IMG1 and the towing vehicle image IMG2. The object distance D-n may be displayed in the composite image. For example, the object distance D-n may be overlaid on the composite image, for example coincident with or adjacent to the corresponding object of interest in the composite image.

It will be appreciated that various changes and modifications can be made to the present invention without departing from the scope of the present application.

The controller 10 has been described with particular reference to the identification of other vehicles, for example when the towed vehicle V1 and the towing vehicle V2 are moving. Objects of interest O-n other than vehicles are also contemplated. The object of interest O-n could, for example, comprise one or more of the following: a kerb, a traffic cone, a parking bollard, a ramp, a wall and an obstacle. The object of interest O-n could be a visual marking or indicator, for example indicating a boundary of a parking space or a road marking. Alternatively, or in addition, the object of interest could be a person. The controller 10 could be configured to identify one or more pedestrians. The controller 10 may be configured to generate a skeletal model of the or each person by identifying body landmarks.

Other techniques may be used to determine the object distance D-n. One or more proximity sensors provided on the towed vehicle V1 and/or the towing vehicle V2 may be used to determine the object distance D-n. The one or more proximity sensors may comprise one or more of the following: an ultrasonic sensor, a LIDAR sensor and a RADAR sensor.

The controller 10 optionally determines a heading (or bearing) of the object of interest O-n relative to the towed vehicle V1. The heading may optionally be output for display, for example as an overlay on the towed vehicle image IMG1 and/or the towing vehicle image IMG2.

Aspects of the invention are laid out in the following numbered clauses.

1. A driver assistance system for a towing vehicle coupled to a towed vehicle, the driver assistance system comprising a controller, the driver assistance system being configured to:
   receive first image data from a towed vehicle imaging device disposed on the towed vehicle, the first image data comprising a first scene behind the towed vehicle;
   process the first image data to identify object image data representative of one or more objects of interest in the first scene;
   determine an object distance from a reference point to the or each object of interest identified in the first scene; and
   output a signal indicative of the object distance.

2. A driver assistance system according to clause 1, wherein the object distance is determined by analysing the first image data.

3. A driver assistance system according to clause 2, wherein the towed vehicle imaging device comprises a mono camera or a stereo camera.

4. A driver assistance system according to any one of the preceding clauses, wherein the driver assistance system is configured selectively to display the first image data; and selectively to overlay the object distance on the first image data.

5. A driver assistance system according to any one of the preceding clauses, wherein the driver assistance system is configured to:
   compare the object distance to a threshold distance; and
   generate a proximity notification when the comparison identifies the object distance as being less than or equal to the threshold distance.

6. A driver assistance system according to clause 5, wherein the driver assistance system is configured to activate a braking system when the towing vehicle is reversing in dependence on the proximity notification.

7. A driver assistance system according to any one of the preceding clauses, wherein the driver assistance system is configured to:
   receive second image data from a towing vehicle imaging device disposed on the towing vehicle.

8. A driver assistance system according to clause 7, wherein the driver assistance system is configured selectively to display the second image data; and selectively to overlay the object distance on the second image data.

9. A driver assistance system according to clause 7 or clause 8, wherein the driver assistance system is configured to:
   combine a part of the first image data and a part of the second image data to generate composite image data; and
   selectively to display the composite image data.

10. A driver assistance system according to clause 9, wherein the driver assistance system is configured selectively to overlay the object distance on the composite image data.

11. A vehicle comprising a driver assistance system according to any one of the preceding clauses.

12. A method of assisting a driver of a towing vehicle coupled to a towed vehicle, the method comprising:
   receiving first image data from a towed vehicle imaging device disposed on the towed vehicle, the first image data comprising a first scene behind the towed vehicle;
   identifying one or more objects of interest in the first scene;
   determining an object distance from a reference point to the or each object of interest identified in the first scene; and
   outputting the determined object distance.

13. A method according to clause 12 comprising analysing the first image data to determine the object distance.

14. A method according to clause 13, wherein the towed vehicle imaging device comprises a mono camera or a stereo camera.

15. A method according to any one of clauses 12, 13 or 14 comprising selectively displaying the first image data; and selectively overlaying the object distance on the first image data.

16. A method according to any one of clauses 12 to 16 comprising:
   comparing the object distance to a threshold distance; and
   generating a proximity notification when the comparison identifies the object distance as being less than or equal to the threshold distance.

17. A method according to clause 16 comprising activating a braking system when the towing vehicle is reversing in dependence on the proximity notification.

18. A method according to any one of clauses 12 to 17 comprising:
receiving second image data from a towing vehicle imaging device disposed on the towing vehicle.

19. A method according to clause 18 comprising selectively displaying the second image data; and selectively overlaying the object distance on the second image data.

20. A method according to any one of clauses 12 to 19, wherein the method comprises:
combining a part of the first image data and a part of the second image data to generate composite image data; and
selectively displaying the composite image data.

21 A method according to clause 20, wherein the method comprises selectively overlaying the object distance on the composite image data.

22. Computer software that, when executed, is arranged to perform a method according to any one of clauses 12 to 21.

23. A non-transitory, computer-readable storage medium storing instructions thereon that, when executed by one or more electronic processors, causes the one or more electronic processors to carry out the method of any one of clauses 12 to 22.

The invention claimed is:

1. A driver assistance system for a towing vehicle coupled to a towed vehicle, the driver assistance system comprising a controller, the driver assistance system being configured to:
receive first image data from a towed vehicle imaging device comprising a mono camera disposed on the towed vehicle, the first image data comprising a first scene behind the towed vehicle taken at a first time;
receive second image data from the towed vehicle imaging device disposed on the towed vehicle, the second image data comprising the first scene behind the towed vehicle taken at a second time temporally offset from the first time;
process the first image data to identify object image data representative of one or more objects of interest in the first scene by differentiating between image elements in the first image data corresponding to background features and image elements in the first image data corresponding to one or more other vehicles or one or more stationary obstacles and classifying the image elements corresponding to the one or more other vehicles or one or more stationary obstacles as the one or more objects of interest;
determine, by comparing the first image data and the second image data, an object distance from a reference point to the or each object of interest identified in the first scene;
output a signal indicative of the object distance;
selectively display the first image data; and
provide an indication of the object distance on the first image data.

2. A driver assistance system according to claim 1, wherein the driver assistance system is configured to:
compare the object distance to a threshold distance; and
generate a proximity notification when the comparison identifies the object distance as being less than or equal to the threshold distance.

3. A driver assistance system as claimed in claim 2, wherein the driver assistance system is configured to activate a braking system when the towing vehicle is reversing in dependence on the proximity notification.

4. A driver assistance system according to claim 1, wherein the driver assistance system is configured selectively to display the second image data; and selectively to overlay the object distance on the second image data.

5. A driver assistance system according to claim 1, wherein the driver assistance system is configured to:
combine a part of the first image data and a part of the second image data to generate composite image data; and
selectively to display the composite image data.

6. A driver assistance system according to claim 5, wherein the driver assistance system is configured selectively to overlay the object distance on the composite image data.

7. A driver assistance system according to claim 1, wherein processing of the first image data to identify object image data representative of one or more objects of interest in the first scene includes generating optical flow vectors representing a direction and magnitude of movement of image elements in the first image data and the second image data and, based on the optical flow vectors, differentiating between the image elements in the first image data and the second image data.

8. A driver assistance system according to claim 7, wherein use of the optical flow vectors for differentiating the image elements in the first image data includes determining persistence information of the one or more objects based on the optical flow vectors and then determining, for each of the one or more objects, whether the one or more objects corresponds to a vehicle of the one or more vehicles.

9. A driver assistance system according to claim 1, wherein a color of each the indication of each of the object distances is adjusted based on the object distance relative to a predetermined distance threshold.

10. A vehicle comprising the driver assistance system set forth in claim 1.

11. A method of assisting a driver of a towing vehicle coupled to a towed vehicle, the method comprising:
receiving first image data from a towed vehicle imaging device comprising a mono camera disposed on the towed vehicle, the first image data comprising a first scene behind the towed vehicle taken at a first time;
receiving second image data from the towed vehicle imaging device disposed on the towed vehicle, the second image data comprising the first scene behind the towed vehicle taken at a second time temporally offset from the first time;
identifying one or more objects of interest in the first scene by differentiating between image elements in the first image data corresponding to background features and image elements in the first image data corresponding to one or more other vehicles or one or more stationary obstacles and classifying the image elements corresponding to the one or more other vehicles or one or more stationary obstacles as the one or more objects of interest;
determining, by comparing the first image data and the second image data, an object distance from a reference point to the or each object of interest identified in the first scene;
outputting the determined object distance;
selectively displaying the first image data; and
providing an indication of the object distance on the first image data.

12. A non-transitory, computer-readable storage medium storing instructions thereon that, when executed by one or more electronic processors, causes the one or more electronic processors to carry out the method set forth in claim 11.

13. A method according to claim 11, wherein use of the optical flow vectors for differentiating the image elements in the first image data includes determining persistence information of the one or more objects based on the optical flow vectors and then determining, for each of the one or more objects, whether the one or more objects corresponds to a vehicle of the one or more vehicles.

14. A method according to claim 11, wherein a color of each the indication of each of the object distances is adjusted based on the object distance relative to a predetermined distance threshold.

* * * * *